UNITED STATES PATENT OFFICE.

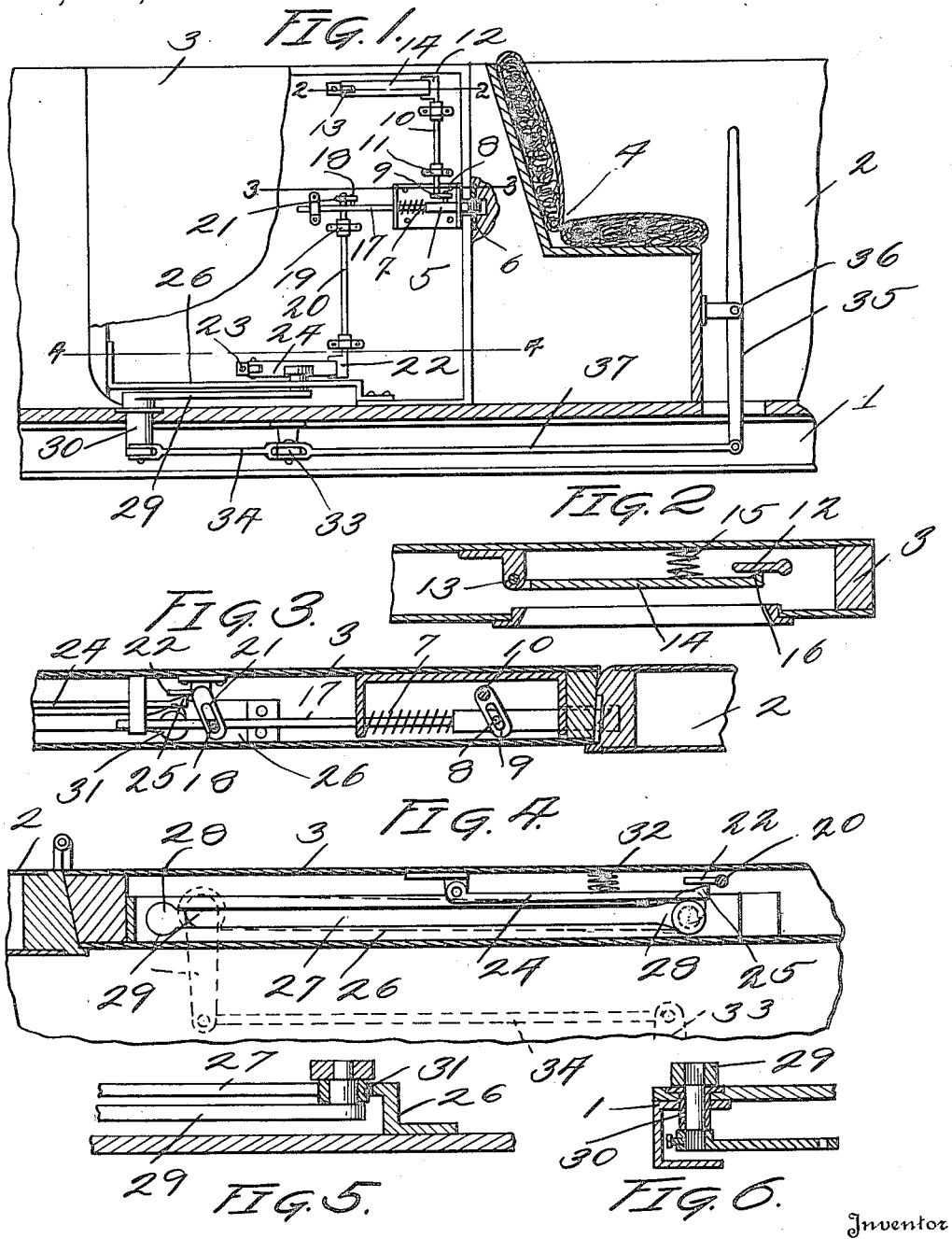

GEORGE A. BOSLER, OF CHICAGO, ILLINOIS.

AUTOMOBILE-DOOR OPENER.

1,214,488.  Specification of Letters Patent.  Patented Jan. 30, 1917.

Application filed April 27, 1916. Serial No. 94,008.

*To all whom it may concern:*

Be it known that I, GEORGE A. BOSLER, a citizen of the United States, residing at Chicago, in the county of Cook, State of Illinois, have invented certain new and useful Improvements in Automobile-Door Openers; and I do hereby declare the following to be a full, clear, and exact description of the invention, such as will enable others skilled in the art to which it appertains to make and use the same.

This invention relates to an automobile door opener.

An object of the invention resides in the provision of a device by means of which the door of an automobile may be opened from the driver's seat or from within or without the machine.

A further object of the invention resides in so constructing the device that the door may be opened without necessitating the operator's reaching over the edge of the door.

A further object of the invention resides in so constructing the device that the operating means at the driver's seat will in no way prevent the operation, that is to say, the opening of the door by the means on the door.

With these and other objects in view, such as will appear as my description progresses, my invention comprises the combination and arrangement of parts as set forth in and falling within the scope of the appended claims.

In the drawing: Figure 1 is an elevational view of my device showing the same applied to an automobile, only a portion of the latter being shown however and the door being shown in its closed position; Fig. 2 is a sectional view on line 2—2 of Fig. 1; Fig. 3 is a section on line 3—3 of Fig. 1, looking at the door locking means; Fig. 4 is a section on line 4—4 of Fig. 1; Fig. 5 is an enlarged detail of the guide plate and the operating means mounted thereon, and Fig. 6 is a fragmental detail showing the manner in which the operating lever is mounted in the frame.

In the drawing I have illustrated a portion of an automobile which includes a frame 1, a body 2, a door 3 and a driver's seat 4. A locking bolt 5 is slidably mounted upon the door and coöperates with a plate 6 on the body 2 to maintain the door in a locked position, the bolt being normally pressed into engagement with the plate 6 by a spring 7. In order that this bolt may be retracted by a person who is about to enter or leave the automobile, I have provided the same with a pin 8 which extends outwardly from the body thereof and which extends through a loop 9 formed on the lower end of a rod 10, which rod is rotatably mounted in bearings 11 on the door 3. The upper end of the rod is provided with a crank portion 12 which extends in angular relation to the body of the rod. Pivotally mounted, at 13, on the door 3 adjacent its upper edge, is a push plate 14, the free end of which is normally pressed away from the door by a spring 15 and is provided with a cam 16 which is adapted to contact with the crank portion 12 of the rod. When the free end of this plate is pushed toward the door 3 against the tension of the spring 15 the cam 16 on the end thereof contacts with the crank portion 12 of the rod and rotates the rod so that the bolt 5 is withdrawn from the plate 6 and the door may be opened.

In order that the bolt may be controlled from the operator's seat, I have extended from the bolt 5 a rod 17 which is provided with a pin 18.

Mounted on the door, rotatably in bearings 19, is a rod 20 which is provided, at its upper end, with a slotted crank portion 21 and at its lower end, with a crank portion 22 similar to the crank portion 12 on the rod 10. Pivoted, at 23, adjacent the lower edge of the door is a push plate 24 which is provided with a cam 25 adapted to engage the crank portion 22 on the rod 20. Mounted on the lower portion of the door is a plate 26 which is located beneath the push plate 24 and is provided with a slot 27 which extends longitudinally thereof and is provided with enlargements 28 on its ends. A lever 29 is mounted in a bearing 30 which is in turn mounted on the frame 1 of the machine. One end of this lever is provided with a roller 31 which extends into the slot 27 in the plate 28 and is adapted to slide therein. The plate 24 is so located that it will be moved over the slot 27 by a coil spring 32. It will therefore be obvious that when the roller 31 moves toward the plate 24 that it will contact with the same and cause the cam portion 25 to engage the crank portion 22 of the rod 20 to withdraw the bolt 5. A lever 33 is pivoted to the frame 1 and is connected to the lever 29 by a link 34. An operating lever 35 is pivotally mounted, at 36, on the driver's seat 4 and the lower end of this lever is connected to the lever 33 by a link 37 so that the movement of the roller 31 in the slot 27 may be effected. It will thus be seen that the bolt 5 may be controlled, not only by the push plate at the upper end of the door but also by the driver so that the door may be readily opened.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. In an automobile, the combination with the door thereof, of a locking bolt therefor, a pin extending outwardly from the bolt, a rod rotatably mounted on the door and having a slotted portion engaging the pin, the rod having also a crank portion on its upper end, a push plate pivotally mounted adjacent the upper edge of the door and having a cam portion on the free end thereof arranged to engage the crank portion on the rod, and resilient means for normally moving the push plate away from the crank portion of the rod.

2. In an automobile, the combination with the door thereof, of a bolt for locking the same, said bolt having a rod extending outwardly therefrom on which rod a pin is mounted, a rod rotatably mounted on the door and having a slotted crank portion engaging the pin and having also a crank portion on its lower end, a push plate pivotally mounted on the door and having a cam thereon arranged to engage the crank portion on the lower end of the rod, a plate extending beneath the push plate and having a slot therein, a lever mounted on the frame of the machine and having a roller extending into the slot in the last mentioned plate, means for moving the push plate to a position above the slot and means for operating the lever to move the roller within the slot in such manner that it will contact with the push plate and actuate the same to cause the rotation of the last mentioned rod.

In testimony whereof, I affix my signature, in the presence of two witnesses.

GEORGE A. BOSLER.

Witnesses:
WILLIAM C. WOOD,
JOHN OLSON.